(No Model.)
H. P. DAVISS.
FENCE.
No. 256,298. Patented Apr. 11, 1882.
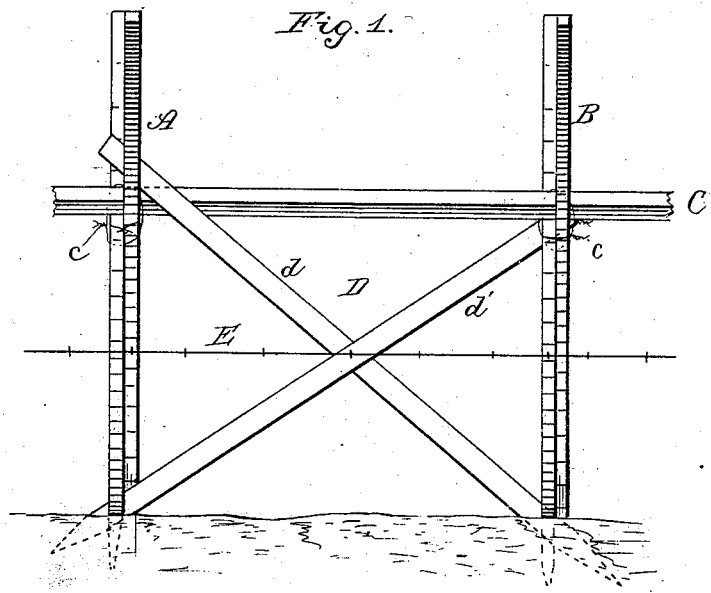
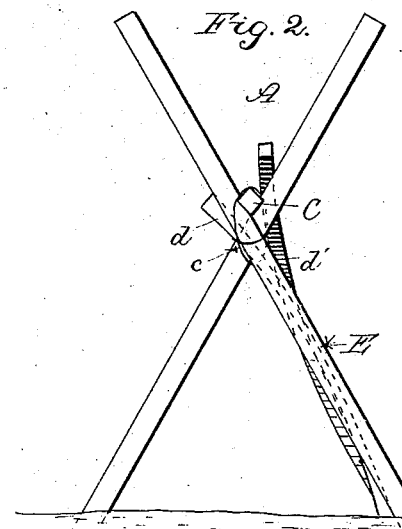
Witnesses.
J. W. Garner
W. S. D. Haines
Inventor
Horatio P. Daviss
by Wraud A. Snow
Attorney

UNITED STATES PATENT OFFICE.

HORATIO P. DAVISS, OF FAIRFIELD, TEXAS.

FENCE.

SPECIFICATION forming part of Letters Patent No. 256,298, dated April 11, 1882.

Application filed December 12, 1881. (No model.)

*To all whom it may concern:*

Be it known that I, HORATIO P. DAVISS, a citizen of the United States, residing at Fairfield, in the county of Freestone and State of Texas, have invented certain new and useful Improvements in Fences, of which the following is a specification, reference being had therein to the accompanying drawings.

My invention relates to fences; and it consists in the arrangement of its several parts, as will be hereinafter fully set forth.

In the drawings, Figure 1 is a side elevation, and Fig. 2 an end view, of my fence.

A A and B B are cross-bars. Their lower ends are driven firmly into the ground, as shown. Placed between the crotches of the bars is the pale C, which is secured to them by wires $c$, as shown. Crossed between the bars are the spring-bars D. Their lower ends are driven into the ground at the base of the crossed bars, and are extended across diagonally to the opposite cross-bar. The upper end of the bar $d$ is placed in the crotch in front of the pale C, and may, if desired, be secured there by wires. The bar $d'$ crosses in front of the bar $d$, as shown, and is placed upon the opposite side of the cross-bar, immediately opposite the junction of the bars, as shown.

It is not necessary to secure the bars D to the cross-bars A and B, as the tension secured upon them by crossing the bar $d'$ and behind both the cross-bars B will secure great firmness and much additional bracing strength to the cross-bars A and B.

A barbed wire, E, may be stretched along the fence at a level with the point where the bars D cross, as shown.

What I claim is—

1. In a fence, the bars A and B and pale C, in combination with the bars $d$ $d'$, substantially as shown and described.

2. In a fence, the bars D, having their lower ends driven into the ground at the base of the bars A and B, the upper end of the bar $d$ being placed in the crotch of the bars A in front of the pale C, and the bar $d'$ crossing in front of the bar $d$ and sprung behind both the bars B, substantially as and for the purposes set forth.

In testimony whereof I affix my signature in presence of two witnesses.

HORATIO P. DAVISS.

Witnesses:
JAS. S. S. CORRY,
L. G. SANDIFER.